Feb. 19, 1963     E. A. HOLLINGSHEAD ETAL     3,078,159
SUBHALIDE DISTILLATION OF ALUMINUM
Filed Nov. 12, 1959
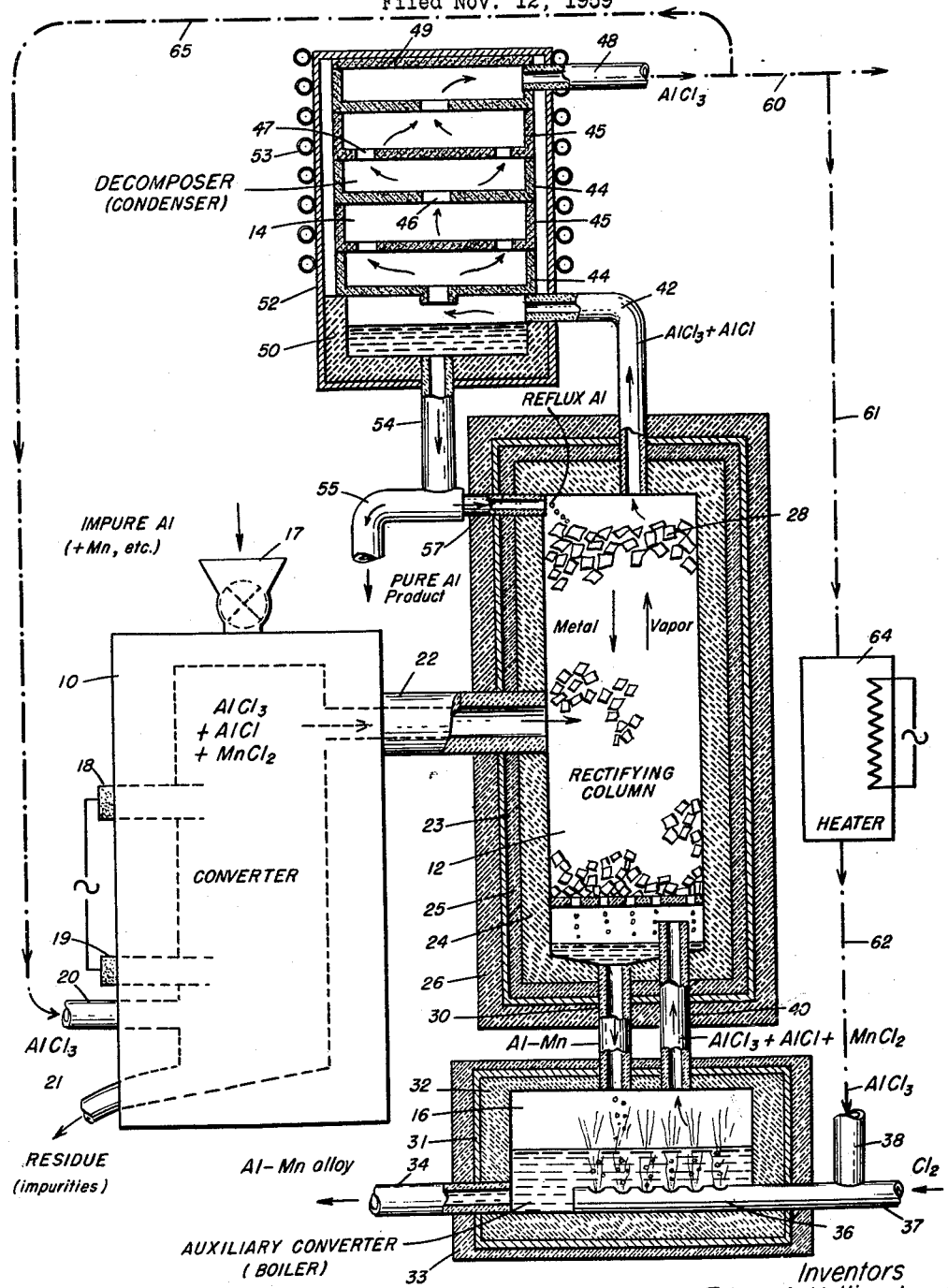
Inventors
Ethan A. Hollingshead
Norman W. F. Phillips
By
Robert S. Dunham
Attorney United States Patent Office 3,078,159
Patented Feb. 19, 1963

3,078,159
SUBHALIDE DISTILLATION OF ALUMINUM
Ethan A. Hollingshead and Norman W. F. Phillips, Arvida, Quebec, Canada, assignors to Aluminium Laboratories Limited, Montreal, Quebec, Canada, a corporation of Canada
Filed Nov. 12, 1959, Ser. No. 852,403
14 Claims. (Cl. 75—63)

This invention relates to the so-called subhalide distillation of aluminum, e.g. from metallic materials or compositions which contain aluminum and other metals, and in a more particular sense, the present improvements are related to the recovery of purified metallic aluminum, and other materials, from the subhalide gas or vapor. In such procedure, which is also sometimes called a catalytic distillation, the impure or contaminated aluminum-bearing material is treated to yield a gaseous subhalide of aluminum, at an elevated temperature, and the gas comprising the subhalide is conducted to a condenser, conveniently called a decomposer, where a reverse chemical reaction occurs, involving dissociation of the subhalide to yield relatively pure aluminum metal which is collected as the product. The reaction in the decomposer also yields the normal aluminum halide which is separable or separated, e.g. preferably remaining in gaseous form and being conducted away, as for re-use.

The present invention is designed to provide improved procedure and apparatus for recovering metallic aluminum from the subhalide gas, and particularly for effecting such recovery of pure aluminum separately from, or without appreciable contamination by, other metals that may be transported in subhalide form.

In a preferred way of carrying out the subhalide distillation process, the metallic material is treated in a suitable converter where it is heated and where a halide in gaseous state is brought into contact with it, for example aluminum trichloride or tribromide, i.e. $AlCl_3$ or $AlBr_3$, also commonly called aluminum chloride and aluminum bromide. At appropriate temperature, ordinarily in the range of 1000° C. and upwards, and under suitable pressure, which may be atmospheric or sub-atmospheric, the gaseous halide reacts with the aluminum in the material to produce in gaseous form an aluminum subhalide, e.g. a monohalide. Thus where the treating vapor is aluminum trichloride the gas conducted from the converter contains at least a considerable proportion of aluminum monochloride. In the decomposer, as stated above, the reverse reaction occurs, with the subhalide reverting to aluminum and normal aluminum halide, so that by these chemical operations called subhalide distillation, highly pure aluminum is sought to be obtained from material of much less purity.

Under some circumstances, for example as explained in U.S. Patent No. 2,723,911 (Phillips et al.) granted November 15, 1955, one or more other metals present in the original mixture or alloy undergo reversible distillation reactions with the aluminum trihalide, so that volatile, dissociating halides of such other metals are transported from the converter to the decomposer. While the conversion reaction, producing the aluminum monohalide and a volatile halide of another metal, is greatly preferential to aluminum whereby the transported contamination of other metal is generally minor relative to the original proportion of such other metal in the alloy treated, it is nevertheless objectionable if reactively condensed in a manner to contaminate the desired aluminum product. Manganese is particularly troublesome in that it almost invariably comes off as volatile halide, in significant quantities, if it is present and especially if the conversion is performed at temperatures upwards of 1000° C. Aluminum alloys produced by direct thermal reduction of aluminum ore often contain manganese, so that it is likely to be present in the gas when the subhalide process is used for purifying such alloys, even though its concentration in the alloy may be very small. Under some conditions other metals such as iron, silicon, titanium, copper, chromium and nickel may also tend to distil, as volatile, dissociating halides, in objectionable amount with the aluminum.

As also disclosed in the cited U.S. patent, it has been found that manganese and other metals of the class described above will reactively condense faster, so to speak, than the aluminum, so that physical separation of a condensate rich in the manganese or other impurity can be achieved, relative to the pure aluminum deposited, for instance, at a more remote region of the condenser. While for many purposes such fractionation of the condensed metal can be achieved by simple provision of temperature drop or gradient along the condensing region, the present invention is directed to an improved mode of recovering pure aluminum and particularly for separating manganese and like impurities, as by a reactive condensation or decomposing system which embraces rectification.

Thus it has now been discovered that a rectifying operation can be performed with the subhalide-containing vapor, wherein the phenomena of decomposition and metal deposit, and of conversion of metal to dissociating halide form, can be utilized in the manner of condensation and boiling or vaporization, in a rectification treatment. A conventional rectification system usually consists of three principal elements, namely the column, a condenser and a boiler, the condenser serving to extract the purified, e.g. liquid, product, while returning some of the latter as reflux, countercurrent to the vapor travel in the column, the impurity-enriched reflux from the foot of the column being subjected to a vaporization treatment in the boiler for supply of supplemental vapor into the lower part of the column. As applied to subhalide vapors, similar elements are used, viz. a decomposition section corresponding to the condenser, a column of appropriate dimensions and arrangement for efficient contact between vapor and molten metal reflux, and a boiler in the nature of an auxiliary converter, where the reflux, high in impurity, is treated with halide and heat to evolve, by conversion reaction, the desired supplemental subhalide-containing vapor to travel upwardly in the column, joining the main vapor feed.

A troublesome problem in employing such rectification system has been found to reside in providing the heat required for refluxing, i.e. in heating the materials in the auxiliary converter or boiler (e.g. aluminum-manganese alloy and aluminum trichloride vapor), so as to produce the desired supplemental stream of subhalide-containing gas. With the alloy in molten condition and with the reaction being required to occur at a very high temperature (e.g. upwards of 1000° C. and usually at or above 1300° C.), and because of the corrosive properties of the materials, especially aluminum trichloride, ordinary heating methods have been found difficult to apply or highly inefficient. Electrical resistance heating is not feasible, nor can common types of electrical heating elements be directly exposed without rapid deterioration, while supply of heat from external means is rendered difficult through heavy refractory walls or layers required to contain the reactants.

An important feature of the present invention resides in the discovery that the heat for the rectifying process can be efficiently and satisfactorily supplied by the exothermic reaction of gaseous halogen with aluminum in the boiler. Specifically, for instance, where the operation of the boiler is to yield a vapor, i.e. gas, containing aluminum monochloride (and necessarily also some manganese halide, viz. $MnCl_2$) by reaction between the aluminum-manganese alloy and aluminum trichloride, the heat for such endothermic reaction, and for part or all of the thermal losses from the boiler and the column, is obtained by the exothermic reaction of gaseous chlorine with aluminum, in the boiler region. The elemental halogen, e.g. chlorine, is preferably introduced with the stream of aluminum halide, e.g. trichloride, gas entering the boiler so that a mixture of the two gases comes in contact with the liquid (molten) alloy. Thus the reaction of chlorine with aluminum to produce aluminum trichloride yields a substantial amount of heat, which is availed of, for the endothermic reaction of aluminum trichloride with aluminum to produce the desired aluminum monochloride (subhalide).

A highly efficient heat supply is provided in this manner, without additional apparatus or devices in exposure to the corrosive conditions. Local over-heating or overcooling due to any action of one gas in reacting faster than the other, is unlikely to occur, since the molecular collision efficiencies of both reactions are high (i.e. the exothermic reaction of chlorine and the endothermic reaction of aluminum trichloride, with the aluminum), and the rates of reaction are limited by the rates of diffusion to the gas-metal interface. A further aspect of considerable advantage in this operation, is that the chlorine, in addition to supplying heat to the boiler, removes aluminum from the alloy there contained and thus increases the efficiency of the rectification system. Such removal of aluminum, as will now be apparent, is involved in the desired exothermic reaction of the chlorine with such metal, to yield the normal chloride, i.e. the trichloride. Moreover, the aluminum trichloride produced from the chlorine may be employed to make up losses in the distillation process, and also to supply the market for this chemical. While the procedure above described is capable of performance where the entire heat requirement (in the boiler) is furnished by the reacting chlorine, and in such case there is no need for other heating means, it is contemplated that substantial advantages of the process can also be realized where only a portion of the heat is supplied in this manner; for example, in some cases some of the heat may be satisfactorily obtainable by electrical means, the remainder being then derived by the use of chlorine gas.

It will be understood that the rectifying system may embody apparatus of a variety of types and arrangements, as adapted for a rectifying function, and in general including the elements, column, condenser and boiler, as described above. The column is fed, preferably at an intermediate level, by the gas from a suitable converter where crude or impure metal is treated with aluminum chloride to evolve aluminum monochloride. Such vapor feed also contains the undesired impurity, such as the volatile dissociating halide of manganese ($MnCl_2$) or the volatile, dissociating halides of other metals, or combinations. There is also usually present, of course, a quantity of unreacted aluminum trichloride. The reactant gas is advanced through the converter and a vapor feed is thence carried up the column and through the condenser, by appropriate means such as a pump (not shown) beyond the latter, functioning so as to maintain the desired pressure conditions, customarily atmospheric or sub-atmospheric, in the converter and other parts of the system.

Primarily for purposes of illustrating the process, the accompanying drawing shows a diagrammatic assembly of the several principal elements of the rectifying system, with the converter to supply gaseous feed, the parts of the rectification unit being shown as if in vertical section.

Referring to the system of the drawing, it will be further understood that the various parts of the apparatus are shown essentially as an illustrative example, with considerable simplification and modification of dimensional and proportional relationships in order to adapt the system to a single, compact view. It will be apparent that the actual proportions of each element, as likewise the mutual proportions, relations and connections of the several elements, should be selected to suit the attainment of desired results, as will now be readily apparent to those skilled in the art. Other types of devices can be employed for the function of decomposer, column and auxiliary converter, and likewise devices of larger or otherwise different type and arrangement, for instance so as to afford longer paths in the column, greater condensing area in the decomposer and more extensive liquid-gas interface in the boiler or auxiliary converter section.

Basically, the apparatus is adapted to receive vapor feed from a suitable converter 10, such feed being supplied to an intermediate (preferably central) level of the rectifying column 12, which is thus of the so-called center-fed type. Gas withdrawn at the top of the column passes through the decomposer 14, while metal high in impurity is collected from the bottom of the column in the boiler 16 where the auxiliary vapor supply is generated. The illustrated devices 10 to 16 inclusive are all conveniently upright cylindrical structures, mechanically designed, as with appropriately resistant linings, to contain the gases, molten metals and other materials that are involved in the operations.

For example, the converter 10 is an enclosed chamber which is kept filled, as by successive increments added at the top hopper 17, with a charge of impure metal to be treated, for example solid fragments, granules or the like, of an alloy containing aluminum and other metals from which the aluminum is to be separated. The solid charge is appropriately heated, as by electrical resistance heating, with current supplied by electrodes 18, 19, while aluminum trichloride gas, preferably preheated, is introduced through a conduit 20 at a lower part. The solid residue of the converter, substantially depleted of aluminum, is withdrawn through a duct 21.

The derived vapor containing, say, aluminum monochloride with a significant contamination of manganese in volatile dissociating halide form, and unreacted aluminum trichloride, is delivered through a conduit 22 into the rectifying column 12 at an intermediate point of the latter. The rectifying column is constituted by an enclosed, refractory lined and thermally insulated upright vessel. For instance, it may involve a gas tight cylindrical steel shell 23 and a heavy internal lining 24 of refractory material resistant to aluminum and aluminum chloride at temperatures up to 1300° C. or more, a suitable material being dense sintered alumina. A layer of thermal insulation 25 may be interposed between the dense refractory and the steel shell, and there should also be external thermal insulation 26, the nature and thickness of the insulating layers being preferably such as to keep the steel shell at as low a temperature as possible, but very preferably above the condensation temperature of aluminum trichloride, say above 200° C. Internally, the vessel constituting the column 12 is advantageously arranged to afford very extended areas of contact between the vapor and the liquid. Unusually extended contact is desirable in order to avoid column structures of unreasonably large and thus uneconomical size, it being understood that in comparison with common types of rectification systems, the present operation involves relatively large volumes of vapor and relatively small quantities of impurity, the concentration of manganese in the vapor feed being usually of a relatively low value.

The column is thus internally constructed or filled to afford the desired gas-liquid contact at relatively high temperature. Although other means may be used, such as transverse porous refractory plates through which the vapor passes and bubbles through the liquid metal that travels across each plate in succession, or a vertical series of chambers where the gas is given intimate contact with the liquid metal by splashing devices or the like, an effective arrangement, shown for simplicity of illustration, is a packing of refractory material 28. Such packing may consist of fragments of dense alumina, or regular shapes thereof such as rings or the like, filling the column and permitting countercurrent flow of vapor and molten metal.

From a pipe 30 at the foot of the column, the collected or collecting molten metal flows into the boiler 16 which may, for example, have a construction, as a vessel, similar to that of the column 12. For simplicity of illustration, the structure is shown as involving a gas tight steel shell 31 with an internal layer of alumina refractory 32 and an outer covering of thermal insulation 33. Molten metal, containing the impurity or impurities withdrawn by the rectifying system, is discharged through a conduit 34 from the lower part of the boiler, while gas is introduced and brought into intimate contact with the molten metal in any suitable fashion, for instance as through a pipe 36 having a plurality of openings which release such gas to bubble up, with more or less turbulence, from a lower region of the liquid metal. As indicated, by its supply section 37 and branch supply line 38, the pipe 36 is connected to receive both chlorine gas and aluminum trichloride in desired proportions and amounts. From the upper part of the auxiliary converter or boiler 16, the evolved vapor is led by a pipe 40 into the bottom of the rectifying column, e.g. above the collecting liquid metal.

From the top of the column 12 another pipe 42 conducts the vapor, here depleted of impurity, into the decomposer or condenser 14, which may be of any type appropriate for cooling the gaseous mixture to effectuate dissociation or decomposition of the aluminum subhalide, yielding the normal halide and depositing, as for collection, the substantially pure aluminum metal in molten form. Although other types of decomposers may be employed, for instance such as a device including metal-splashing means to effectuate reduction of vapor temperature and corresponding decomposition reaction (as embraced by U.S. Patent No. 2,914,398, issued November 24, 1959, Johnston et al.), the drawing shows a simple, multiple-baffle device, for convenience of illustration, but nevertheless substantially effective. The baffle column may consist, for instance, of a stack of dense graphite trays as at 44, 45, each having a horizontal bottom plate, and the respective bottom plates being alternately provided with central openings 46 and openings 47 near the lateral periphery. Thus the vapor entering below the stack of trays, as shown, follows a circuitous path to the discharge pipe 48 from the uppermost aray, which has a top graphite closure 49, while condensed metal similarly flows downward and into a refractory lined reservoir 50. The entire assembly is enclosed in a steel or other metallic shell 52 which may advantageously be separated, by a space as shown, from the graphite walls of the trays 44, 45 and which may have cooling jacket means 53 for circulation of water or other liquid coolant. Heat transfer by radiation is thus effected between the graphite assembly, which has high thermal conductivity, and the cool wall of the shell 52; such transfer is well regulated, being at a high rate at the lower part and much lower at the upper part where the rate of decomposition is lowest, the radiation being further reduced by intermediate shielding (not shown) around the upper part of the graphite assembly, e.g. if necessary to avoid condensation of aluminum in the solid state.

From the bottom of the reservoir 50, a conduit system 54—55 allows withdrawal of the product, i.e. purified molten aluminum. A desired minor proportion of the pure aluminum is also continuously supplied, as through a branch pipe 57, into the head of the rectifying column, to trickle downward through the packing 28, in a distributed manner.

Certain features and combinations of method and apparatus for decomposing gaseous aluminum monohalide to yield liquid aluminum, which are disclosed herein relative to the decomposer 14 per se, are not claimed herein, but are disclosed and claimed in the copending application of Ethan A. Hollingshead, Norman W. F. Phillips and Frederick William Southam, Serial No. 75,734, filed December 14, 1960, for Subhalide Distillation, said application Serial No. 75,734 being owned by Aluminium Laboratories Limited, the assignee of the present application.

If desired, the system may also involve recirculation of gaseous aluminum trichloride, as indicated by dot-and-dash lines. Thus through suitable conduit lines at 60, 61, 62, a desired quantity can be supplied to the conduit 38 for introduction into the boiler 16. This gas, as likewise other gas supply, may require pre-heating, an electrical heating unit 64 being diagrammatically indicated for such purpose, in the line 61—62. In addition to drawing excess aluminum trichloride from the line 60 for use or sale, the major body of this gas is recirculated to the inlet 20 of the converter, as by a conduit path 65, again with appropriate pre-heating (not shown) if desired. It will be understood that various appurtenances as may be necessary to a practical operating system of the character shown are omitted for simplicity, i.e. any and all necessary valves, traps, pumps, or other flow directing or controlling instrumentalities. For example, pumping means are appropriately provided, say in the immediate outlet 48 of the decomposer, as to effectuate the desired complete circulation of gases, including maintenance of intended conditions, e.g. subatmospheric, in the converter and other elements; such pumping means being conventional in subhalide distillation systems and being therefore omitted from the drawing.

Continuing with the example of treatment of an aluminum alloy by monochloride distillation under such circumstances that some manganese chloride ($MnCl_2$) is evolved to contaminate the aluminum monochloride, it will be seen that a continuous stream of gas consisting essentially of the stated dissociating chlorides together with a substantial content of unreacted aluminum trichloride is delivered through the conduit 22 into the rectifying column 12. As this vapor traverses the upper or so-called enriching section of the column, it passes countercurrent to a downward flow of molten aluminum from the decomposer 14. Reverse reaction occurs chiefly, or at least greatly preferentially, with respect to the manganese chloride, depositing manganese in the molten reflux aluminum, so that the vapor departing through the upper pipe 42 consists wholly of aluminum trichloride and aluminum monochloride, essentially or entirely free of contaminating metal halide.

In the decomposer, the aluminum monochloride component of the received gaseous mixtures is dissociated or decomposed, yielding highly pure aluminum metal which collects in molten form in the reservoir 50, while the gaseous trichloride discharges through the pipe 48.

As explained above, the fraction of liquid aluminum which is refluxed downward through the rectifying column collects manganese as it traverses the upper section above the vapor feed entrance 22, and progresses further downward to drain into the auxiliary converter or boiler 16. A mixture of gaseous aluminum trichloride and chlorine gas are supplied to the boiler, being brought into intimate and thorough contact with the molten metal, whereby the chlorine reacts exothermally with the aluminum to yield aluminum trichloride and monochloride, and aluminum trichloride (in effect supplied in excess) reacts endothermally with aluminum metal, utilizing heat of the first reaction, to yield aluminum monochloride. As indicated, in general, aluminum trichloride is supplied along with the chlorine, since the heat requirements can be furnished by considerably less chlorine than would correspond to the total trichloride requirement. By way of illustration, these operations and their respective heats of reaction, for example as effected at 1200° C., are as follows (the aluminum being in molten form and other substances being gaseous):

$$Al + 1.5Cl_2 \rightarrow AlCl_3 + 142 \text{ kcal.} \quad (1)$$

$$2Al + AlCl_3 \rightarrow 3AlCl - 94 \text{ kcal.} \quad (2)$$

Thus from the boiler a highly heated gaseous mixture of aluminum monochloride and unreacted aluminum trichloride, with some further small proportion of manganese chloride (necessarily incident to the reactions) is delivered upward through the pipe 40 into the bottom of the rectifying column. As such gas traverses the lower or exhausting section of the column, at least a considerable part of the manganese is lost by decomposition and deposit in the downwardly traveling aluminum-manganese alloy, the upwardly passing gas mingling with the gas feed at the center of the column and the impurity-depleting process continuing in the upper section as described above. By the rectifying system, with effective reflux of molten aluminum and subhalide with the liquid and gaseous components in countercurrent flow, a purified vapor is continuously withdrawn into the condenser 14, while a relatively large concentration of impurities is discharged into and through the boiler 16. At the same time, heat losses in the rectifying column are made up by the heated gases from the boiler, for maintenance of the desired conditions, or supplemental heat supply can be provided if desired.

Thus the functioning of the rectifying system is rendered feasible and effective by the described use of chlorine as heating agent in the boiler. The rectification process itself operates in accordance with the well-known principles of such systems, yielding a highly pure aluminum product, and concentrating the impurity (e.g. manganese) in the alloy discharged to (and from) the boiler, which alloy may have utility as such. For instance, where the vapor feed contains manganese in amount of 1% to 2% (by weight) of the total condensable metal, the balance being aluminum, the pure product metal may contain no more than about 0.01% to 0.1% Mn, while the boiler alloy may comprise from 10% to 50% Mn. The net amount of aluminum lost, so to speak, to the maganese alloy, by reflux and by such decomposition of aluminum monochloride as may occur in the column (e.g. in the upper section) is thus relatively small, it being further understood that the recirculated $AlCl_3$ not only re-distils aluminum from the boiler, but may also do so in the column, as in the lower section. By the described rectifying operation an efficient process is provided, for separation, in effect, of the contaminating metal and for good recovery of purified product.

It will be understood that except as the present improvements may be considered to relate to a complete process of subhalide distillation, the operation of the converter 10 or other source of subhalide vapor is not per se a a feature of invention. Indeed the procedure of treating aluminum-containing metal compositions (e.g. alloys) or mixtures to yield a gas containing aluminum monochloride or the like is now well known and many instances of such operation and of the conditions required for the conversion, utilizing a wide variety of compositions (with various proportions of aluminum and accompanying metals such as iron, silicon, manganese, titanium and others), have been described in the art. Thus the above-cited U.S. Patent No. 2,723,911 sets forth a number of different examples of such treatment, whereby aluminum is reactively thus distilled away from most of the accompanying material but where the gas is nevertheless objectionably contaminated with volatile halide of other metals, including manganese. For these reasons, and since the basic functioning and conditions of the rectifying system with such vapor mixtures will be readily apparent in view of the known principles of rectifying operations, specific exemplifications seems unnecessary here, but examples are given below, to illustrate the novel feature of heat supply by the exothermic chlorine-aluminum reaction, i.e. the manner in which the system is operated and the heat requirements (for rectification) satisfied, with respect to given compositions of vapor feed such as may readily be derived from the performance of the conversion stage in known ways.

In these examples, all amounts and percentages, except as otherwise apparent, are given by weight, and the operations are to be understood as involving the above-described rectifying process as applied to a manganese-contaminated gaseous feed, e.g. through the conduit 22.

*Example I*

In this example the proportions of $AlCl_3$, $AlCl$ and $MnCl_2$ in the vapor feed are such as correspond to a conversion of 0.5 (50%) of the aluminum trichloride originally supplied to the converter to $AlCl$ and $MnCl_2$, and also correspond to a manganese content of 1.5% in the total condensable metal. The gas mixture, i.e. the vapor feed, is supplied into the rectifying column at a pressure of 0.1 atmosphere and at a temperature of 1140° C., which is close to the saturation temperature for the defined vapor composition at the stated pressure. In operation, the aluminum withdrawin from the condenser has a manganese content of 0.01%, while the alloy from the boiler 16 contains 10% manganese (balance aluminum). The reflux ratio, which is the ratio of metal returned to the top of the column at the pipe 57 to the total amount of metal leaving the top of the column as vapor in the pipe 42, is 0.16; in accordance with standard rectification theory, this value of the ratio is sufficient to make the number of theoretical plates required in the column less than two.

Under these conditions the heat required, excluding that needed to re-heat the aluminum trichloride circulated from the decomposer 14 to the boiler 16 and also excluding the heat losses from the boiler and the column, is 1.0 kcal. per mole of metal produced, i.e. net total of aluminum and manganese produced and withdrawn (outside the system) from the condenser and boiler. This amount of heat is supplied by introducing into the boiler, i.e. the auxiliary converter 16, 0.020 mole of $Cl_2$ per mole of metal (total metal produced, as above). By such feed of chloride, 0.013 mole of aluminum is converted to aluminum trichloride and correspondingly 0.013 mole of aluminum trichloride is produced in the rectification system. The pre-heating of the aluminum trichloride as recirculated to the auxiliary converter is effected by the supplemental heater 64. Further heat as necessary for the losses from the boiler and column may be furnished by additional chlorine to the boiler or by supplemental heating instrumentalities as indicated above.

*Example II*

In this operation, the proportions of $AlCl_3$, $AlCl$ and $MnCl_2$ in the vapor feed correspond to the conversion of 0.2 (20%) of the original aluminum trichloride in the converter, and to a manganese content of 1.5% in the total condensable metal. As introduced, the pressure of the vapor is 1.0 atmosphere and the temperature is 1330° C., such being 100° C. above the saturation value for the stated pressure and vapor composition. The manganese content of the purified aluminum from the condenser is 0.1%, while the alloy collected in the auxiliary converter contains 50% manganese. The operation is controlled to provide a reflux ratio of 0.15, which is sufficient to make the number of theoretical plates required in the column about two.

For these conditions the required heat, excluding that needed for re-heating the aluminum trichloride circulated to the boiler and excluding the heat losses of the boiler and column, is again 1.0 kcal. per mole of metal produced. The amount of aluminum trichloride recirculated is sufficient to re-distil from the column that part of the metal reflux which is in excess of the quantity required to form the 50% Mn alloy; such recirculated amount of aluminum trichloride is 0.30 mole per mole of metal produced, and the energy required to re-heat is 3.0 kcal. The heat losses are 2.0 kcal., so that the total heat requirement is 6.0 kcal. per mole of metal produced. In this instance, the entirety of the heat requirement is supplied by introducing 0.086 mole of $Cl_2$ per mole of metal into the auxiliary converter. Thus 0.060 mole of aluminum is converted to aluminum trichloride and 0.060 mole of aluminum trichloride is produced in the rectification system. In this operation, no separate re-heater (as at 64) is needed, and all of the heat losses are made up by the exothermic chlorine reaction.

Although the invention has been exemplified in a process where the aluminum is transported as aluminum monochloride, and elemental chlorine is used as the heating agent in the boiler, it will be appreciated that similar procedure is applicable to other subhalide distillations, for example as by treating the aluminum material with aluminum tribromide, the boiler heat supply then being effected with elemental bromine. Likewise the principles and practice of the invention are appropriate for separation of impurities other than manganese in the rectifying column, and for combinations of impurities, e.g. of the sort named above. The apparatus is likewise capable of modification, as has been explained, one instance being the arrangement of the boiler as an integral part of the rectifying column, e.g. in the lower or bottom portion thereof. In all cases, the process affords an efficient and economical way of treating the vapor in a subhalide distillation operation, to separate contaminating metal while reactively depositing a purified aluminum product. It may be noted that in general, the insulated rectifying column functions effectively without heating or cooling means, the heat exchange in the column being confined, as far as it can be, to the interaction between the countercurrently traveling gaseous and liquid phases.

The procedure of effecting conversion of aluminum metal to subhalide in the manner described relative to the boiler 16, e.g. by supplying chlorine and aluminum trichloride in gaseous form so that the heat requirements are furnished by the exothermic reaction of the elemental halogen with the metal, is applicable to other situations or places in a subhalide distillation system where local generation of heat is required, for instance in effectuation of part or all of the original production of aluminum monochloride-containing vapor from impure aluminum.

It is to be understood that the invention is not limited to the specific embodiments herein set forth, but may be carried out in other ways without departure from its spirit.

We claim:

1. In procedure for purification of aluminum by subhalide distillation wherein a vapor is produced containing aluminum monohalide and a dissociating halide of an impurity metal which reactively condenses faster than aluminum upon fall of temperature, the process comprising subjecting said produced vapor to a rectifying system including a column and a decomposer for yielding purified aluminum in the decomposer and impurity-enriched aluminum-containing molten metal in the column, said process including advancing the vapor and molten aluminum metal in countercurrent relation in the column, continuing the advance of said molten aluminum metal to a reaction zone associated with an end of the column, said molten aluminum metal as it advances through the column becoming enriched with impurity metal reactively condensed from the aforesaid vapor which is advanced through the column, so that said molten aluminum metal while traveling to said end of the column becomes the aforesaid impurity-enriched aluminum-containing molten metal, reacting some aluminum of said impurity-enriched metal with aluminum trihalide in said zone to produce gaseous aluminum monohalide for depletion of the aluminum in said impurity-enriched metal, producing heat for effectuating said last-mentioned reaction of aluminum with aluminum trihalide by treating said impurity enriched metal in said zone with gaseous halogen for exothermic reaction of said halogen with aluminum, and directing the produced gas from said reaction zone into and through the column along with the first-mentioned vapor for augmenting the purified aluminum in the decomposer, while reactively condensing the dissociating halide of the impurity metal, in the column, and there collecting the impurity in the countercurrently traveling metal.

2. In procedure for purification of aluminum by subhalide distillation wherein a vapor is produced containing aluminum monohalide and a dissociating halide of an impurity metal which reactively condenses faster than aluminum upon fall of temperature, the process comprising advancing said produced vapor through a rectifying column to a decomposer, while effecting countercurrent flow of molten aluminum metal from the decomposer to remove the impurity metal into said molten aluminum metal by reactive condensation of the aforesaid halide of said impurity metal, reactively condensing the aluminum monohalide in the decomposer to deposit purified aluminum therein while removing some of the purified aluminum as product and supplying some of said purified aluminum as molten aluminum metal to the rectifying column as aforesaid, said molten aluminum metal being supplied to one end of the column and becoming impurity-containing molten metal as it travels to the opposite end of the column, supplying to a reacting region associated with said opposite end of the column the impurity-containing molten metal of the rectifying column, gaseous aluminum trihalide and gaseous halogen, there reacting said halogen with some aluminum of said impurity-containing molten metal exothermically and by the heat of said exothermic reaction reacting the said trihalide with some aluminum of said impurity-containing molten metal to yield gaseous aluminum monohalide, advancing the product vapor from said region through the column for removal of impurity therefrom and for augmenting the first-mentioned aluminum monohalide which is traveling to the decomposer, and withdrawing impurity-enriched metal from said reacting region.

3. In procedure for purification of aluminum by subhalide distillation wherein a vapor is produced containing aluminum monohalide, unreacted aluminum trihalide, and a dissociating halide of an impurity metal which reactively condenses faster than aluminum upon fall of temperature, the process comprising advancing said produced vapor along a rectifying column to one end thereof while flowing molten aluminum metal in an opposite direction from said one end to the other end of the column and while exposing said flowing molten aluminum metal to the aforesaid vapor for reactive condensation of the impurity metal into said flowing molten aluminum metal, withdrawing from the said first end of the column the aforesaid vapor containing aluminum monohalide and substantially depleted of the halide of the impurity metal, advancing said withdrawn vapor through a decomposer for reactively condensing said monohalide to metallic aluminum in molten form and yielding a gaseous discharge from said decomposer consisting essentially of aluminum trihalide, withdrawing a portion of the molten aluminum from the decomposer to constitute the flow of same through the rectifying column, collecting said molten metal which has traveled through the column and which has received the aforesaid impurity metal, in a reacting region associated with said other end of the column, while supplying aluminum trihalide and gaseous halogen to said reacting region, there reacting said halogen exothermically with some aluminum of said molten metal and by the heat of said exothermic reaction, effectuating reactions in said region, of the aluminum trihalide with some aluminum of said molten metal and to the extent unavoidable, with some impurity metal thereof, said reactions of said halogen and of the trihalide in said region providing a vapor product of said reacting region containing aluminum trihalide, aluminum monohalide and a dissociating halide of the impurity metal, conducting said last-mentioned vapor through the rectifying column and in augmentation of the first-mentioned vapor, for further separation of the impurity metal into the molten aluminum metal traversing the column, and withdrawing respectively from the decomposer and the aforesaid reacting region, metal products respectively comprising purified aluminum and a mixture of aluminum and the impurity metal.

4. In procedure for purification of aluminum by subhalide distillation wherein a vapor is produced containing aluminum monochloride and a dissociating chloride of an impurity metal which reactively condenses faster than aluminum upon fall of temperature, the process comprising subjecting said produced vapor to a rectifying system including a column and a decomposer for yielding purified aluminum in the decomposer and impurity-enriched aluminum-containing molten metal in the column, said process including advancing the vapor and molten aluminum metal in the counter-current relation in the column, so that the impurity metal reactively condenses from the vapor into said molten aluminum metal to yield the aforesaid impurity-enriched aluminum-containing molten metal at the lower end of the column, continuing the advance of said impurity-enriched molten metal to a reaction zone associated with said lower end of the column, reacting some aluminum of said impurity-enriched metal with aluminum trichloride in said zone to produce gaseous aluminum monochloride for depletion of the aluminum in said impurity-enriched metal, producing heat for effectuating said last-mentioned reaction of aluminum with aluminum trichloride by treating said impurity-enriched metal in said zone with chlorine gas for exothermic reaction of chlorine with aluminum, and directing the produced gas from said reaction zone into and through the column along with the first-mentioned vapor for augmenting the purified aluminum in the decomposer, while reactively condensing the dissociating chloride of the impurity metal, in the column, and there collecting the impurity in the countercurrently traveling metal.

5. A process as defined in claim 4, in which the impurity metal comprises manganese.

6. In procedure for purification of aluminum by subhalide distillation wherein a vapor is produced containing aluminum monochloride and a dissociating chloride of an impurity metal which reactively condenses faster than aluminum upon fall of temperature, the process comprising subjecting said produced vapor to rectification by travel through a rectifying column to a decomposer for producing purified aluminum product in the decomposer and impurity-enriched aluminum-containing molten metal in the column by reactive condensation in each of said decomposer and column, supplying the impurity-enriched metal, aluminum trichloride and chlorine gas to a reacting region, there exothermically reacting the chlorine with some aluminum of said impurity-enriched metal and by the heat of said exothermic reaction reacting aluminum trichloride with further aluminum of said metal to yield gaseous aluminum monochloride, and directing gaseous product from the reacting region through the column toward the decomposer along with the first-mentioned vapor for augmenting the purified aluminum product while collecting impurity in the molten metal in the column.

7. A process as defined in claim 6, in which the impurity metal comprises manganese.

8. In procedure for purification of aluminum by subhalide distillation wherein a vapor is produced containing aluminum monochloride and a dissociating chloride of an impurity metal which reactively condenses faster than aluminum upon fall of temperature, the process comprising advancing said produced vapor through a rectifying column to a decomposer, while effecting countercurrent flow, through the column to the lower end thereof, of molten aluminum metal from the decomposer to remove the impurity metal into said molten aluminum metal by reactive condensation of the aforesaid chloride of said impurity metal, reactively condensing the aluminum monochloride in the decomposer to deposit purified aluminum therein while removing some of the purified aluminum as product and supplying some of the purified aluminum as molten aluminum metal to the rectifying column as aforesaid, supplying to a reacting region associated with said lower end of the column the impurity-containing molten metal which flows to said lower end of the rectifying column, gaseous aluminum trichloride and chlorine gas, there reacting said chlorine with some aluminum of said molten metal exothermically and by the heat of said exothermic reaction reacting the trichloride with some aluminum of said impurity-containing molten metal in said reacting region to yield gaseous aluminum monochloride, advancing the product vapor from said region through the column for removal of impurity therefrom and for augmenting the first-mentioned aluminum monochloride which is traveling to the decomposer, and withdrawing impurity-enriched metal from said reacting region.

9. A process as defined in claim 8, in which the impurity metal comprises manganese.

10. In procedure for purification of aluminum by subhalide distillation wherein a vapor is produced containing aluminum monochloride, unreacted aluminum trichloride, and a dissociating chloride of an impurity metal which reactively condenses faster than aluminum upon fall of temperature, the process comprising advancing said produced vapor along a rectifying column to one end thereof while flowing molten aluminum metal in an opposite direction from said one end to the other end of the column and while exposing said molten metal to the aforesaid vapor for reactive condensation of the impurity metal into said molten metal, withdrawing from the said first end of the column the aforesaid vapor containing aluminum monochloride and substantially depleted of the chloride of the impurity metal, advancing said last-mentioned vapor from the said first end of the column through a decomposer for reactively condensing said monochloride to metallic aluminum in molten form and yielding a gaseous discharge from said decomposer consisting essentially of aluminum trichloride, withdrawing a portion of the molten aluminum from the decomposer to constitute the flow of same through the rectifying column, collecting said molten metal which has traveled through the column to said other end thereof and which has received the aforesaid impurity metal, in a reacting region associated with said other end of the column while supplying aluminum trichloride and chlorine gas to said reacting region, there reacting the chlorine exothermically with some aluminum of said molten metal and by the heat of said exothermic reaction, effectuating reaction, in said region, of the aluminum trichloride with some aluminum of said molten metal and to the extent unavoidable, with some impurity metal thereof, said reactions of said chlorine and of the trichloride in said region providing a vapor product of said reacting region containing aluminum trichloride, aluminum monochloride and a dissociating chloride of the impurity metal, conducting said last-mentioned vapor through the rectifying column and in augmentation of the first-mentioned vapor, for further separation of the impurity metal into the molten aluminum metal traversing the column, and withdrawing respectively from the decomposer and the aforesaid reacting region, metal products respectively comprising purified aluminum and a mixture of aluminum and the impurity metal.

11. A process as defined in claim 10, in which the impurity metal comprises manganese.

12. In procedure for purification of aluminum by subhalide distillation wherein a vapor is produced containing aluminum monohalide and a dissociating halide of an impurity metal which reactively condenses faster than aluminum upon fall of temperature, the process comprising advancing said produced vapor through a rectifying column to a decomposer associated with one end of the column, while effecting countercurrent flow of molten aluminum metal from the decomposer through the column to the other end thereof to remove the impurity metal into said molten aluminum metal by reactive condensation of the aforesaid halide of said impurity metal, reactively condensing the aluminum monohalide in the decomposer to deposit purified aluminum therein while removing some of the purified aluminum as product and supplying some of said purified aluminum as molten aluminum metal to the rectifying column as aforesaid, supplying to an auxiliary reacting region the impurity-containing molten metal from the aforesaid other end of the column, and in said region, while introducing heat thereto, reacting some aluminum of said last-mentioned impurity-containing molten metal, by said heat, with gaseous aluminum trihalide to yield gaseous aluminum monohalide advancing the product vapor from said region through the column for removal of impurity therefrom and for augmenting the first-mentioned aluminum monohalide which is traveling to the decomposer, and withdrawing impurity-enriched metal from said reacting region.

13. In procedure for purification of aluminum by subhalide distillation wherein a vapor is produced containing aluminum monohalide and a dissociating halide of an impurity metal which reactively condenses faster than aluminum upon fall of temperature, the process of removing said impurity metal from said produced vapor, which comprises producing said vapor by treatment of material containing aluminum and said impurity metal with aluminum trihalide in a converting region, introducing a stream of said produced vapor into a zone of a rectifying column separate from said converting region for advance of the vapor upward through the column to a decomposer beyond the column, introducing a stream of molten purified aluminum metal into a higher zone of the rectifying column so that the molten aluminum metal moves downwardly countercurrent to the ascending monohalide-containing vapor and takes up impurity metal reactively condensed from the halide thereof, withdrawing purified aluminum monohalide vapor at the top of the column into the decomposer and decomposing said purified vapor in said decomposer to form purified aluminum metal, and withdrawing impurity-enriched aluminum metal from a lower zone of the column.

14. In procedure for purification of aluminum by subhalide distillation wherein a vapor is produced containing aluminum monochloride and a dissociating chloride of an impurity metal which reactively condenses faster than aluminum upon fall of temperature, the process of removing said impurity metal from said produced vapor, which comprises producing said vapor by treatment of material containing aluminum and said impurity metal with aluminum trihalide in a converting region, introducing a stream of said produced vapor into a zone of a rectifying column separate from said converting region for advance of the vapor upward through the column to a decomposer beyond the column, introducing a stream of molten purified aluminum metal from the decomposer into a higher zone of the rectifying column so that the molten aluminum metal moves downwardly countercurrent to the ascending monochloride-containing vapor and takes up impurity metal reactively condensed from the dissociating chloride thereof, withdrawing purified aluminum monochloride vapor at the top of the column into the decomposer and decomposing said purified vapor in said decomposer to form molten purified aluminum metal, some of said last-mentioned metal being withdrawn to constitute the first-mentioned stream of molten metal, and withdrawing impurity-enriched aluminum metal from a lower zone of the column.

References Cited in the file of this patent
UNITED STATES PATENTS

| | | |
|---|---|---|
| 1,953,936 | Jacobson | Apr. 10, 1934 |
| 1,980,263 | Frost | Nov. 13, 1934 |
| 1,994,358 | Holstein et al. | Mar. 12, 1935 |
| 2,470,305 | Goss | May 17, 1949 |
| 2,625,472 | Schever | Jan. 13, 1953 |
| 2,723,911 | Phillips et al. | Nov. 15, 1955 |